(12) United States Patent
Haller et al.

(10) Patent No.: US 7,167,680 B2
(45) Date of Patent: Jan. 23, 2007

(54) METHOD, SYSTEM AND COMPUTER READABLE MEDIUM FOR ADJUSTING OUTPUT SIGNALS FOR A PLURALITY OF DEVICES IN A SHORT DISTANCE WIRELESS NETWORK RESPONSIVE TO A SELECTED ENVIRONMENT

(75) Inventors: Amit Haller, Belmont, CA (US); Ziv Haparnas, Tel Aviv (IL); Hans Bielefeld Reisgies, San Jose, CA (US)

(73) Assignee: IXI Mobile (Israel) Ltd., Ra'Anana (IL)

( * ) Notice: Subject to any disclaimer, the term of this patent is extended or adjusted under 35 U.S.C. 154(b) by 0 days.

(21) Appl. No.: 10/358,693

(22) Filed: Feb. 5, 2003

(65) Prior Publication Data

US 2004/0176031 A1 Sep. 9, 2004

(51) Int. Cl.
*H04B 7/00* (2006.01)
(52) U.S. Cl. ............... 455/41.3; 455/41.2; 455/420
(58) Field of Classification Search ............. 455/41.3, 455/41.2, 574, 566, 567, 418, 419, 420
See application file for complete search history.

(56) References Cited

U.S. PATENT DOCUMENTS

| | | | |
|---|---|---|---|
| 5,442,680 A | | 8/1995 | Schellinger et al. |
| 5,457,737 A | | 10/1995 | Wen |
| 5,479,476 A | * | 12/1995 | Finke-Anlauff ............ 455/566 |

(Continued)

FOREIGN PATENT DOCUMENTS

JP 315213 4/2001

(Continued)

OTHER PUBLICATIONS

Guthery et al., "The WebSIM—Clever Smartcards Listen to Port 80", version 15.12.99.

(Continued)

*Primary Examiner*—Matthew D. Anderson
*Assistant Examiner*—Lewis West
(74) *Attorney, Agent, or Firm*—Vierra Magen Marcus & DeNiro LLP

(57) ABSTRACT

A system, method and computer readable medium allows a user to alter output signals for a respective plurality of devices in short distance wireless network in response to a selection of an environment. In embodiments of the present invention, the output signal is a ring tone, alarm, display brightness, vibration signal, or type of language used. In embodiments of the present invention, a system comprises a cellular device and a first device, in a short distance wireless network. The cellular device generates a first short-range radio signal responsive to a selection of an environment. The environment is selected from the group consisting of a meeting, silence, normal and outdoors. According to another embodiment of the present invention, the selection of the environment includes 1) a user pressing a button indicating a selection of the environment 2) a second device, in the short distance wireless network, generating a second short-range radio signal indicating a selection of the environment, 3) a software component, such as a calendar program, selection in response to a user input, or 4) a user making a selection at a web site stored at a processing device. In an embodiment of the present invention, the second device is positioned at an entertainment location.

36 Claims, 18 Drawing Sheets

U.S. PATENT DOCUMENTS

| | | | |
|---|---|---|---|
| 5,572,528 | A | 11/1996 | Shuen |
| 5,742,237 | A | 4/1998 | Bledsoe |
| 5,771,438 | A | 6/1998 | Palermo et al. |
| 5,774,791 | A | 6/1998 | Strohallen et al. |
| 5,793,763 | A | 8/1998 | Mayes et al. |
| 5,805,166 | A | 9/1998 | Hall et al. |
| 5,838,252 | A | 11/1998 | Kikinis |
| 5,896,369 | A | 4/1999 | Warsta et al. |
| 5,929,848 | A | 7/1999 | Albukerk et al. |
| 5,978,386 | A | 11/1999 | Hamalainen et al. |
| 5,987,011 | A | 11/1999 | Toh |
| 5,987,033 | A | 11/1999 | Boer et al. |
| 6,064,734 | A | 5/2000 | Hasegawa et al. |
| 6,067,291 | A | 5/2000 | Kamerman et al. |
| 6,069,896 | A | 5/2000 | Borgstahl et al. |
| 6,078,789 | A | 6/2000 | Bodenmann et al. |
| 6,085,098 | A | 7/2000 | Moon et al. |
| 6,130,602 | A | 10/2000 | O'Toole et al. |
| 6,151,628 | A | 11/2000 | Xu et al. |
| 6,198,948 | B1 | 3/2001 | Sudo et al. |
| 6,218,958 | B1 | 4/2001 | Eichstaedt et al. |
| 6,223,029 | B1 | 4/2001 | Stenman et al. |
| 6,243,581 | B1 | 6/2001 | Jawanda |
| 6,265,788 | B1 | 7/2001 | Davidson et al. |
| 6,282,183 | B1 | 8/2001 | Harris et al. |
| 6,298,443 | B1 | 10/2001 | Colligan et al. |
| 6,326,926 | B1 | 12/2001 | Shoobridge et al. |
| 6,333,973 | B1 | 12/2001 | Smith et al. |
| 6,343,276 | B1 | 1/2002 | Barnett |
| 6,430,408 | B1 | 8/2002 | Dorenbosch |
| 6,434,537 | B1 | 8/2002 | Grimes |
| 6,446,127 | B1 | 9/2002 | Schuster et al. |
| 6,452,910 | B1 | 9/2002 | Vij et al. |
| 6,459,882 | B1 | 10/2002 | Palermo et al. |
| 6,463,078 | B1 | 10/2002 | Engstrom et al. |
| 6,487,180 | B1 | 11/2002 | Borgstahl et al. |
| 6,519,460 | B1 | 2/2003 | Haartsen |
| 6,532,366 | B1 | 3/2003 | Chung et al. |
| 6,600,428 | B1 | 7/2003 | O'Toole et al. |
| 6,630,925 | B1 | 10/2003 | Ostergård et al. |
| 6,633,759 | B1 | 10/2003 | Kobayashi |
| 6,636,489 | B1 | 10/2003 | Fingerhut |
| 6,654,616 | B1 | 11/2003 | Pope et al. |
| 6,665,549 | B1 | 12/2003 | Reed |
| 6,690,929 | B1 | 2/2004 | Yeh |
| 6,763,012 | B1 | 7/2004 | Lord et al. |
| 2001/0047424 | A1 | 11/2001 | Alastalo et al. |
| 2002/0010008 | A1* | 1/2002 | Bork et al. ............... 455/567 |
| 2002/0010683 | A1 | 1/2002 | Aune |
| 2002/0037700 | A1 | 3/2002 | Dooley et al. |
| 2002/0055333 | A1 | 5/2002 | Davies et al. |
| 2002/0058502 | A1 | 5/2002 | Stanforth |
| 2002/0063472 | A1 | 5/2002 | Irvin |
| 2002/0065099 | A1* | 5/2002 | Bjorndahl ............... 455/553 |
| 2002/0065817 | A1 | 5/2002 | Ito et al. |
| 2002/0068559 | A1 | 6/2002 | Sharma et al. |
| 2002/0068600 | A1 | 6/2002 | Chihara et al. |
| 2002/0069037 | A1 | 6/2002 | Hendrickson et al. |
| 2002/0082054 | A1 | 6/2002 | Keinonen et al. |
| 2002/0086718 | A1 | 7/2002 | Bigwood et al. |
| 2002/0091633 | A1 | 7/2002 | Proctor |
| 2002/0102974 | A1 | 8/2002 | Raith |
| 2002/0118663 | A1 | 8/2002 | Dorenborsch et al. |
| 2002/0128051 | A1 | 9/2002 | Liebenow |
| 2002/0132610 | A1* | 9/2002 | Chaplin et al. ............. 455/414 |
| 2002/0142762 | A1 | 10/2002 | Chmaytelli et al. |
| 2002/0143952 | A1 | 10/2002 | Sugiarto et al. |
| 2002/0155830 | A1 | 10/2002 | Iyer |
| 2002/0160764 | A1 | 10/2002 | Gorsuch |
| 2003/0013438 | A1 | 1/2003 | Darby |
| 2003/0017810 | A1 | 1/2003 | Janninck et al. |
| 2003/0022699 | A1* | 1/2003 | Lin ........................... 455/566 |
| 2003/0027563 | A1 | 2/2003 | Herle et al. |
| 2003/0032417 | A1 | 2/2003 | Minear et al. |
| 2003/0050058 | A1 | 3/2003 | Walsh et al. |
| 2003/0054765 | A1 | 3/2003 | Botteck |
| 2003/0060188 | A1 | 3/2003 | Gidron |
| 2003/0060189 | A1 | 3/2003 | Minear et al. |
| 2003/0078036 | A1 | 4/2003 | Chang et al. |
| 2003/0091917 | A1 | 5/2003 | Davenport et al. |
| 2003/0114105 | A1 | 6/2003 | Haller et al. |
| 2003/0115351 | A1 | 6/2003 | Giobbi |
| 2003/0122856 | A1 | 7/2003 | Hubbard |
| 2003/0143992 | A1* | 7/2003 | Humphrey et al. ......... 455/420 |
| 2003/0153280 | A1 | 8/2003 | Kopp et al. |
| 2003/0187807 | A1 | 10/2003 | Matsubara et al. |
| 2003/0194090 | A1 | 10/2003 | Tachikawa |
| 2003/0214940 | A1 | 11/2003 | Takken |
| 2003/0224773 | A1 | 12/2003 | Deeds |
| 2003/0232616 | A1 | 12/2003 | Gidron et al. |
| 2004/0001467 | A1 | 1/2004 | Cromer et al. |
| 2004/0048671 | A1 | 3/2004 | Rowe |
| 2004/0066769 | A1 | 4/2004 | Ahmavaara et al. |
| 2004/0192384 | A1* | 9/2004 | Anastasakos et al. ....... 455/557 |
| 2004/0196812 | A1 | 10/2004 | Barber |
| 2006/0046664 | A1 | 3/2006 | Paradiso et al. |

FOREIGN PATENT DOCUMENTS

| | | |
|---|---|---|
| WO | WO/99/48315 | 9/1999 |

OTHER PUBLICATIONS

Project P946-GI, Smart Devices "When Things Start to Think", Jan. 2000, 2000 EURESCOM Participants in Project P946-GI.

Yee et al., "Integrating Bluetooth With Wireless And Ricocheting", pp. 1310-1314, 2000 IEEE.

Haartsen, "BLUETOOTH—The universal radio interface for ad hoc wireless connectivity", pp. 110-117, Ericsson Review No. 3, 1998.

White Paper, Handheld Devices: Comparing the Major Platforms, www.dell.com/r&d, Dec. 2000.

Miyatsu, Bluetooth Design Background and Its Technological Features, IEICE Trans, Fundamentals, vol. E83-A, No. 11, Nov. 2000.

Parekh, Operating Systems on Wireless Handheld Devices, A Strategic Market Analysis, Massachusettes Institute of Technology, Sep. 28, 2000.

Johansson, et al., Short Range Radio Based Ad-hoc Netowrking: Performance and Properties, IEEE, 1999.

KARAGIANNIS, "Mobility support for ubiquitous Internet access", ERICSSON Open Report, pp. 1-70, Dec. 21, 2000.

* cited by examiner

ED
Device Output
Values 501

Database
416

| | Phone Ring Tone | Laptop Bright | Watch Alarm | Msg Term Text |
|---|---|---|---|---|
| Normal | Medium | Medium | Medium | English |
| Business | Vibrate | Medium | OFF | English |
| Outdoors | High | High | High | English |
| Silence | OFF | OFF | OFF | English |
| Germany | Medium | Medium | Medium | German |

Enviro 502

Welcome to IXI mobile's Environment Settings

User Name — 901
Ziv1

Environment — 902
Normal
Business
Outdoors
Silence
Germany

Device — 903
Telephone
Watch
PDA
Laptop

Output Value — 904
Off
Low
Medium
High
English
German

US 7,167,680 B2

METHOD, SYSTEM AND COMPUTER READABLE MEDIUM FOR ADJUSTING OUTPUT SIGNALS FOR A PLURALITY OF DEVICES IN A SHORT DISTANCE WIRELESS NETWORK RESPONSIVE TO A SELECTED ENVIRONMENT

FIELD OF THE INVENTION

This invention relates generally to a network, and in particular, for providing an output signal for a device in a network.

BACKGROUND OF THE INVENTION

A wireless communication device, such as a cellular telephone, is typically a node of a WAN or communication network. The cellular telephone may also be a part of a short distance wireless network for communicating with other user devices, such as a laptop, watch, messaging terminal, Personal Digital Assistant ("PDA") and/or headset. For example, Bluetooth™ technology provides wireless communications between devices in a short distance wireless network.

A user of a short distance wireless network has numerous devices or terminals that may have output signals. For example, a cellular telephone has a ring tone for an incoming telephone call. A messaging terminal may likewise output a signal that indicates an email has arrived. A watch may output an alarm indicating a scheduled meeting. A laptop computer may output an image having a particular brightness.

A user of a short distance wireless network typically enters numerous types of environments. When a user enters a particular environment, a user typically must first remember to alter output signals of the devices. For example, when a user enters a meeting, a user often must remember to switch a cellular telephone ring tone off in order to avoid disrupting the meeting by an incoming telephone call. Alternatively, a user should remember to increase the ring tone when entering a noisy outdoor environment in order to not miss an incoming telephone call. Assuming the user remembers to adjust the output signals of the devices when entering a different environment, the user also needs to take time in adjusting all the output signals of the respective devices for that particular environment. For example, the user needs to turn off the ring tone for a cellular telephone as well as message alert signal from a PDA when entering a meeting.

Entertainment operators and locations, such as movie theatres, sporting events and restaurants, are also interested in controlling output signals from users' devices. For example, movie theatres and restaurants prefer having users disable or limit any output signals that may disrupt or disturb other patron's experience at the entertainment location.

Therefore, it is desirable to provide a system, a method and a computer readable medium that allows a plurality of device outputs to be adjusted when entering a particular environment. It is further desirable that an entertainment operator may likewise adjust device outputs.

SUMMARY

A method, system, and computer readable medium allows a user to alter output signals for a respective plurality of devices in short distance wireless network in response to a selection of an environment. In embodiments of the present invention, the output signal is a ring tone, alarm, display brightness, vibration signal, or type of language used. In embodiments of the present invention, a system comprises a cellular device and a first device, in a short distance wireless network. The cellular device generates a first short-range radio signal responsive to a selection of an environment.

According to another embodiment of the present invention, the environment is selected from the group consisting of a meeting, silence, normal and outdoors.

According to another embodiment of the present invention, the altering the output signal includes modifying a ring tone.

According to another embodiment of the present invention, the altering the output signal includes generating a vibration signal.

According to another embodiment of the present invention, the altering the output signal includes altering a display brightness.

According to another embodiment of the present invention, the altering the output signal includes altering an alarm signal.

According to another embodiment of the present invention, the altering the output signal includes changing from a first language to a second language.

According to another embodiment of the present invention, the selection of the environment includes a user pressing a button indicating a selection of the environment.

According to another embodiment of the present invention, the selection of the environment includes a second device, in the short distance wireless network, generating a second short-range radio signal indicating a selection of the environment.

According to an embodiment of the present invention, the first device generates a second short-range radio signal, including a request for the first short-range radio signal, after entering the short distance wireless network.

According to an embodiment of the present invention, the selection of the environment includes a software component selection in response to a user input.

According to an embodiment of the present invention, the software component is a software calendar program and a user input is a calendar entry including a period of time.

According to another embodiment of the present invention, the system further comprises a cellular network to provide a cellular signal to the cellular device. A wide area network is coupled to the cellular network. A processing device is coupled to the wide area network and generates a message indicating a selection of the environment.

According to another embodiment of the present invention, a web site is stored at the processing device to allow a user to select the environment.

According to another embodiment of the present invention, the system further comprises a second device, in the short distance wireless network, to alter a second output signal responsive to the first short-range radio signal.

According to an embodiment of the present invention, the first device includes a short-range radio processor and a 2.4 or 5.7 GHZ transceiver.

According to still a further embodiment of the present invention, the cellular device uses a protocol selected from the group consisting of a Global System for Mobile Communications ("GSM"), a Code Division Multiple Access ("CDMA"), a CDMA 2000 protocol, a Time Division Multiple Access ("TDMA"), General Packet Radio Services ("GPRS") and an equivalent thereof.

According to an embodiment of the present invention, the first device is selected from a group consisting of a desktop computer, a laptop computer, a personal digital assistant, a headset, a messaging terminal, a pager, a printer, a thin terminal, a watch, a digital camera or an equivalent.

According to an embodiment of the present invention, the short distance wireless network is a Bluetooth™ network.

According to an embodiment of the present invention, a first device, cellular device and second device is in a short-range wireless network. The first device generates a first short-range radio signal having an environmental selection responsive to a selection of an environment. The cellular device generates a second short-range radio signal having the environment selection responsive to the first short-range signal. The second device alters an output signal responsive to the second short-range radio signal.

According to an embodiment of the present invention, the first device includes a memory location storing a first name corresponding to a first environment and an associated output value and a second name corresponding to a second environment and an associated output value. The cellular device includes a memory location storing the first name corresponding to the first environment and an associated output value and the second name corresponding to the second environment and an associated output value. The second device includes a memory location storing the first name corresponding to the first environment and an associated output value and the second name corresponding to the second environment and an associated output value.

According to an embodiment of the present invention, the selection of an environment includes a user selecting the first name corresponding to the environment provided by a display.

According to an embodiment of the present invention, a method comprises the steps of selecting an environment for a short-range radio network having a plurality of devices. An output signal, from a second device in the plurality of devices, appropriate for the environment is then output in response to a first short-range radio signal generated by a first device.

According to another embodiment of the present invention, the selecting step includes a user selecting a name indicating the environment from first device in the plurality of devices.

According to another embodiment of the present invention, the selecting step includes a processing device generating a message, including a name indicating the environment, over a cellular network, to the first device generating the first short-range radio signal.

According to another embodiment of the present invention, the selecting step includes a third device generating a name indicating the environment to the first device.

According to an embodiment of the present invention, the third device is located near an entertainment location.

According to an embodiment of present invention, an article of manufacture, including a computer readable medium is provided. The article comprises a short-range radio software component to receive a short-range radio signal, indicating an environment, from a device in the short distance wireless network. A software component generates a predetermined output signal responsive to the short-range radio signal.

Other aspects and advantages of the present invention can be seen upon review of the figures, the detailed description, and the claims that follow.

BRIEF DESCRIPTION OF THE FIGURES

FIG. 5 illustrates an environment/device output database shown in FIG. 4 according to an embodiment of the present invention.

DETAILED DESCRIPTION

I. System Overview

Figure 1A:
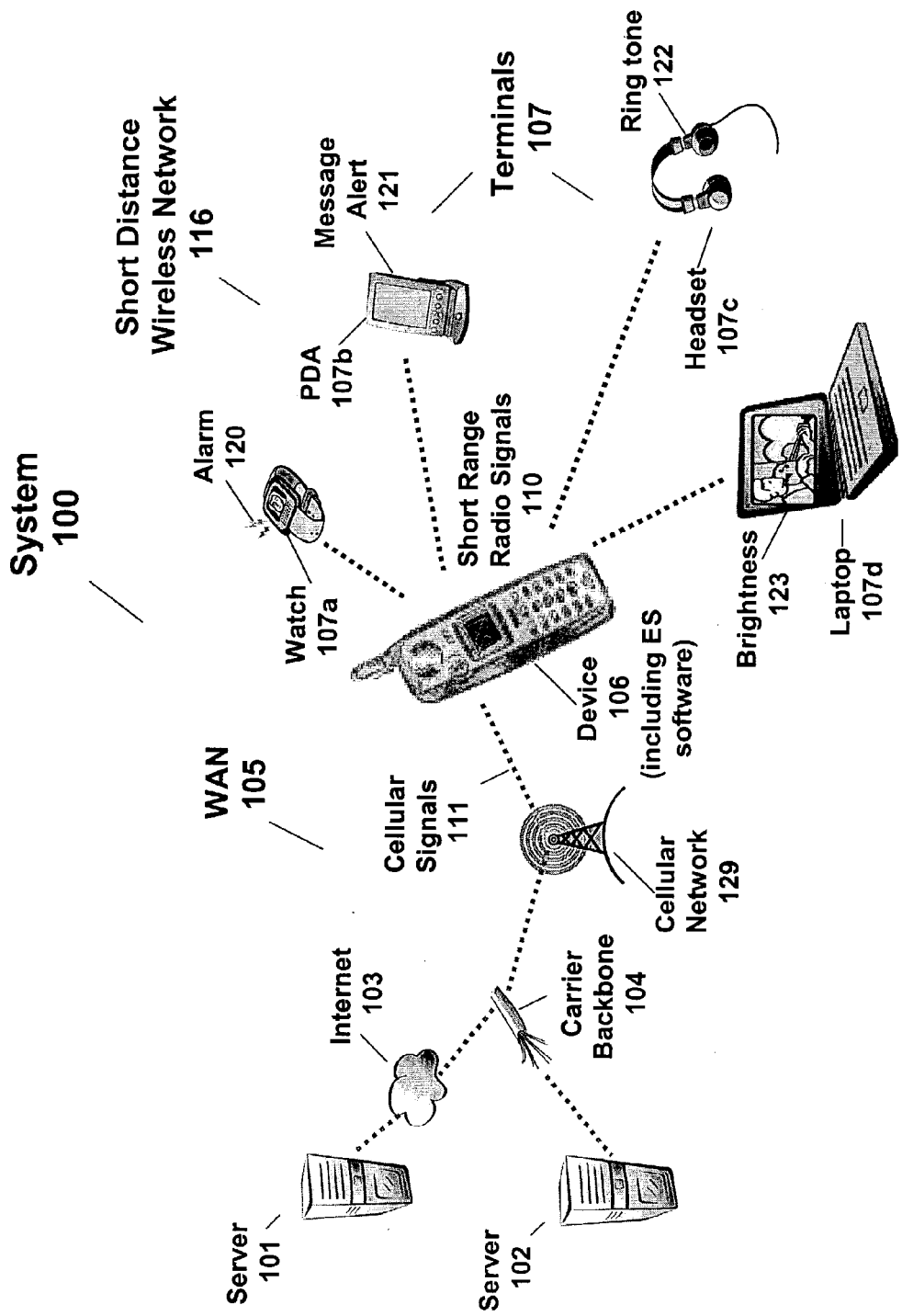
FIG. 1a illustrates a system according to an embodiment of the present invention.

The following description and claims relate to a system, a method and a computer readable medium for providing output signals to respective devices in a short distance wireless network 116, as illustrated by FIG. 1a, in response to a selection of an environment according to an embodiment of the present invention.

Figure 1B:
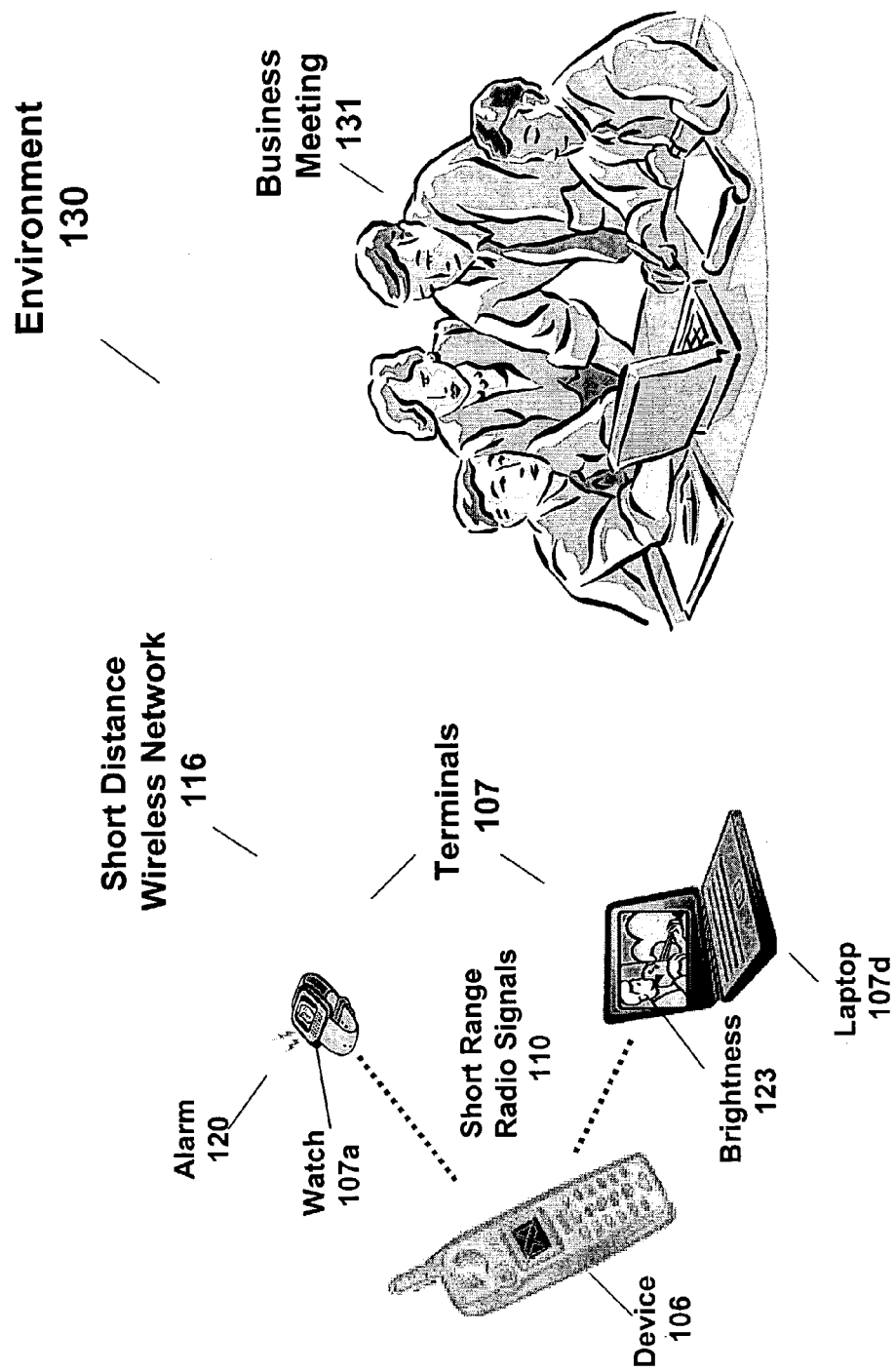
FIGS. 1b–d illustrate short distance wireless networks in respective environments according to embodiments of the present invention.
Figure 1C:
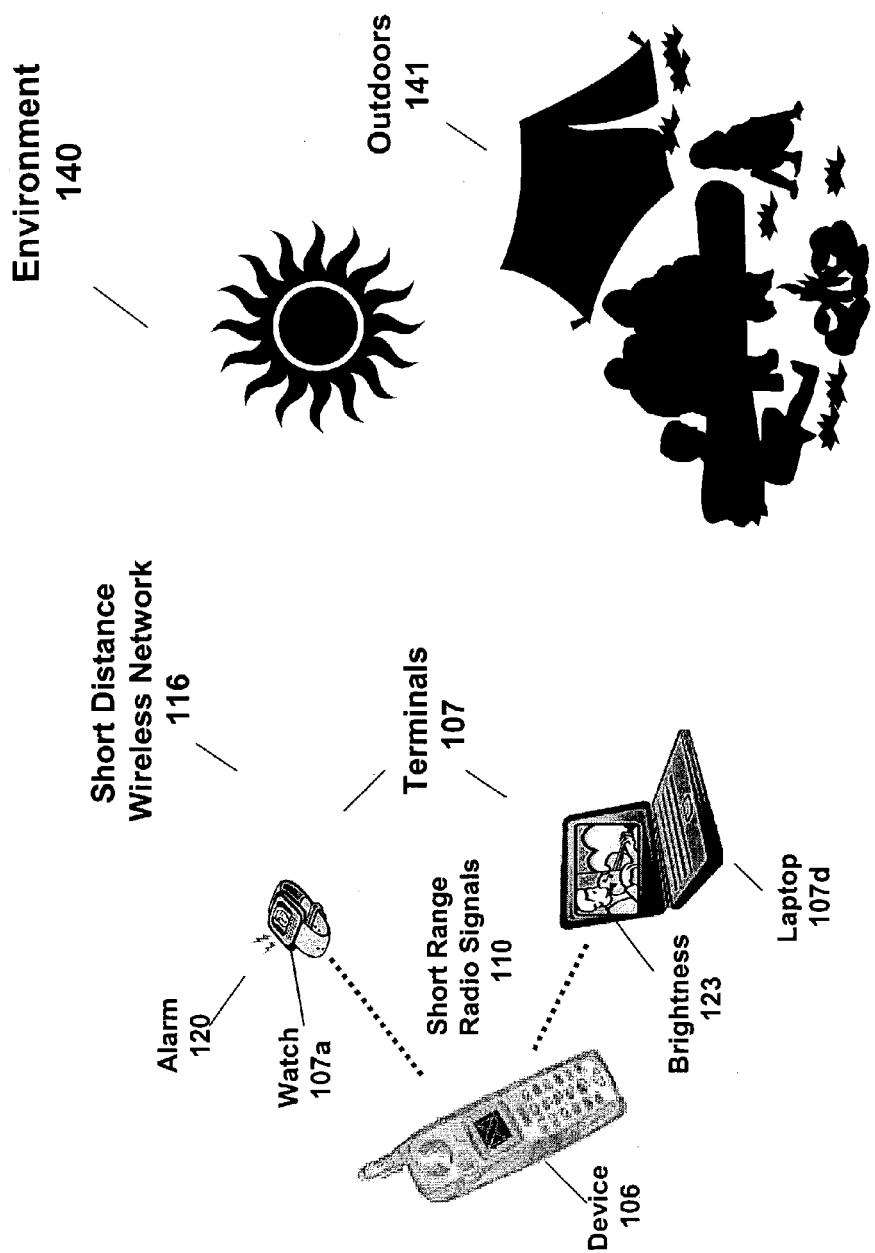

A first plurality of output signals is provided for device 106 and terminals 107 in a first selected environment; while, a second plurality of output signals is provided for device 106 and terminals 107 in a second selected environment. For example, in a business meeting 131, as shown in FIG. 1b, a user may not want to use a ring tone to indicate an incoming call for device 106, which may be a cellular telephone. Instead, a user may prefer to have the cellular telephone vibrate to indicate an important incoming telephone call without interrupting the business meeting. Similarly, a user may bring a laptop 107d to business meeting 131 and prefers that a laptop output signal, display brightness, remains unchanged. In contrast, when a user goes to outdoors 141, as shown in FIG. 1c, which has a higher noise level and glare on the display caused by the sun, a user may prefer to have a ring tone of cellular telephone 106 set at a highest level and a display brightness of a laptop 107d also set at a highest level in order increase the likelihood that a user will be notified of an important incoming telephone call and also be able to easily view a display of laptop 107d in the glaring sun.

In order to obtain the preferred output signals in short distance wireless network 116, the user needs to remember to adjust all the output signals as the environment changes. Similarly, a user needs to take the added time of adjusting the output signals of device 106 and terminals 107 to the desired level or state. If a user fails to alter the output signals as the environment changes, a user may miss an important incoming telephone call or interrupt a business meeting or entertainment event.

In an embodiment of the present invention, an output signal is an alarm 120 from watch 107*a*, a message alert 121 from PDA 121, a ring tone 122 from headset 107*c* or device 106, display brightness 123 or a particular language from laptop 107*d*, or an equivalent thereof. These output signals are exemplary in order to clearly provide embodiments of the present invention and one of ordinary skill in the art understands that there are many other output signals from many other devices that may also be used in alternate embodiments of the present invention.

Figure 1D:
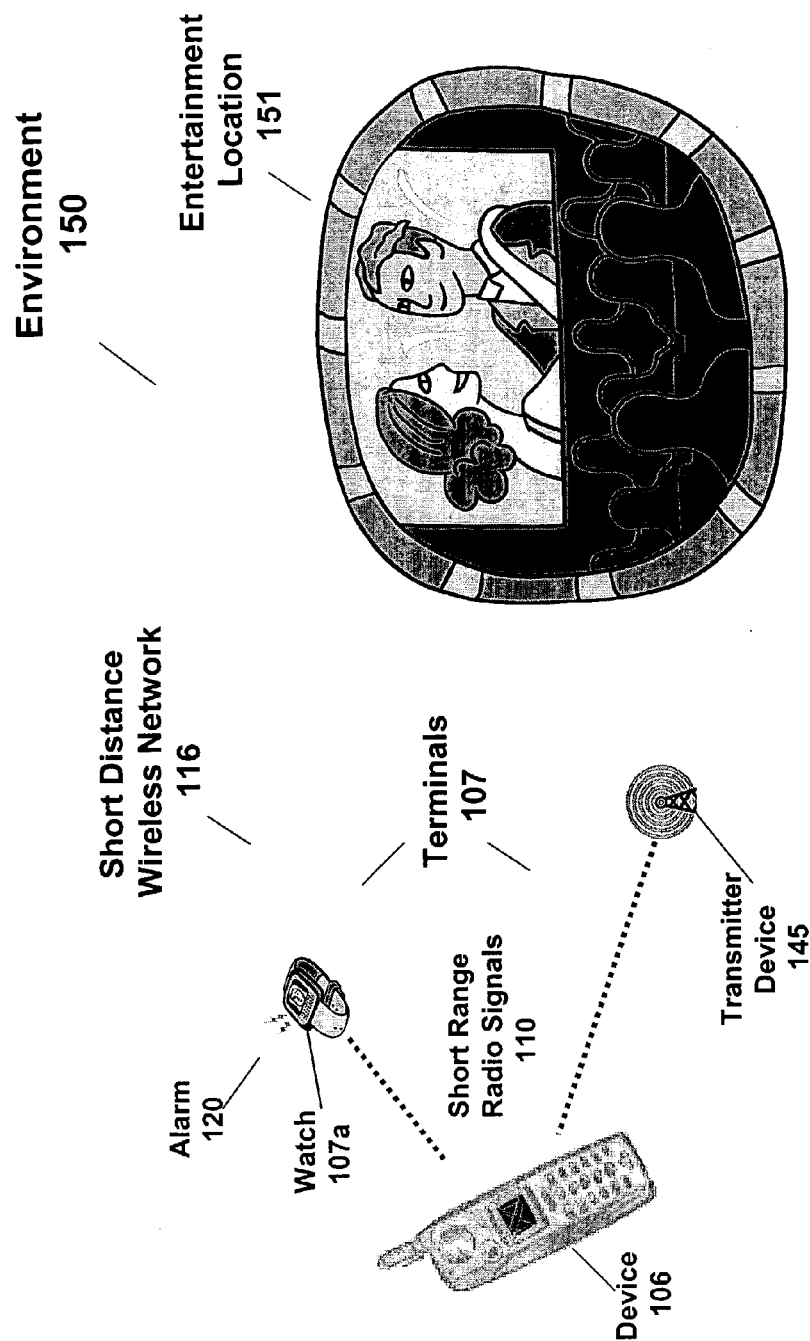
Figure 2:
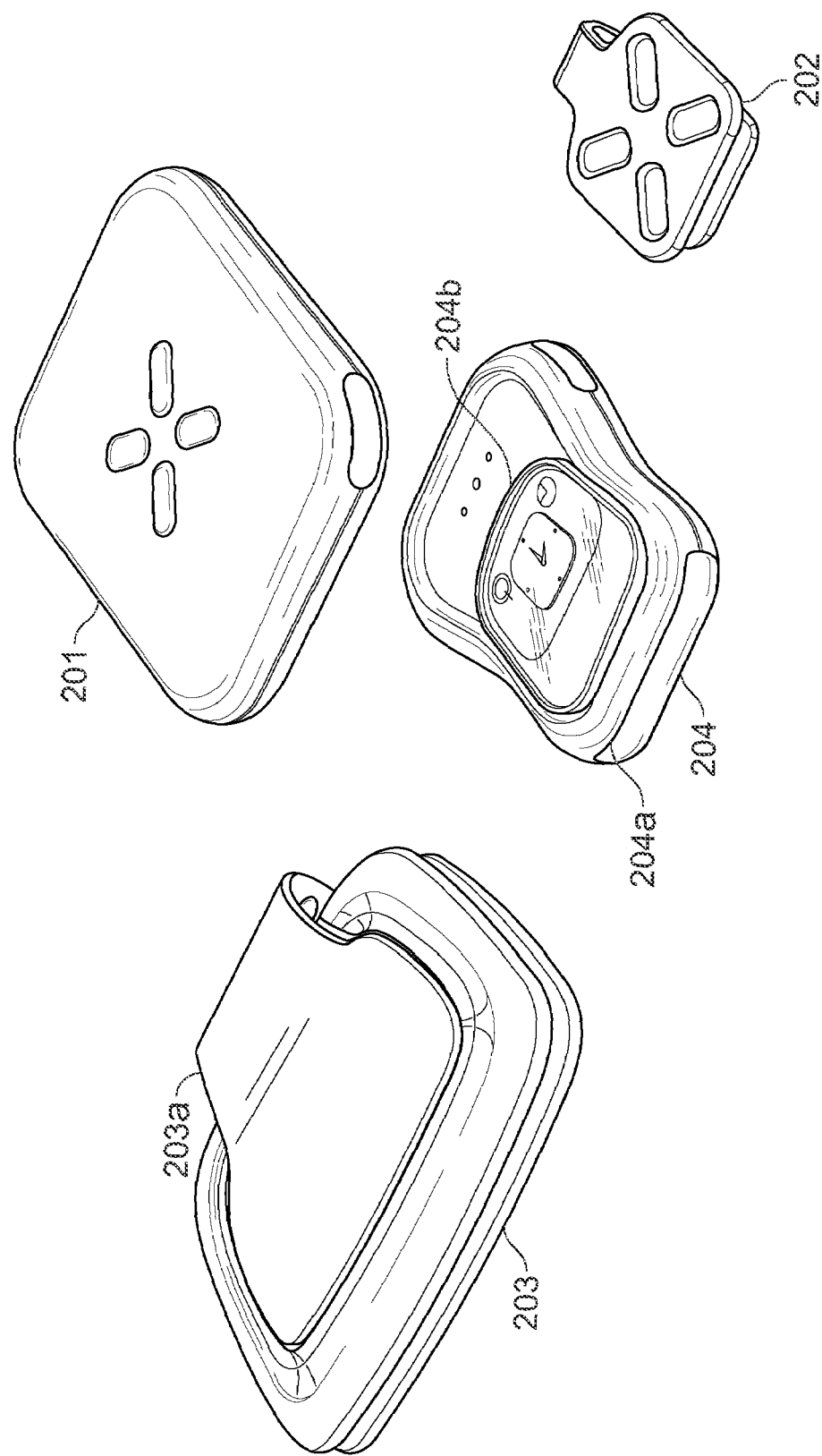
FIG. 2 illustrates thin terminals and a wireless device according to an embodiment of the present invention.

In an embodiment of the present invention, a device 106 generates a short-range radio signal indicating an environment selection to terminals 107 in order to adjust the output signals of terminals 107 for the selected environment. In an embodiment of the present invention, an environment 130 is selected from variety of different types of settings, such as: 1) a normal setting as shown in FIG. 1, 2) a business setting at business meeting 131 as shown in FIG. 1*b*, 2) an outdoors setting at outdoors 141 as shown in FIG. 1*c*, 3) a silence setting at an entertainment location 151, such a movie theatre, as shown in FIG. 1*d*, 4) a geographical or language setting, or an equivalent thereof.

In an embodiment of the present invention, an entertainment location may include a restaurant, movie theatre, sporting event, concert, conference or an equivalent thereof.

Figure 4:
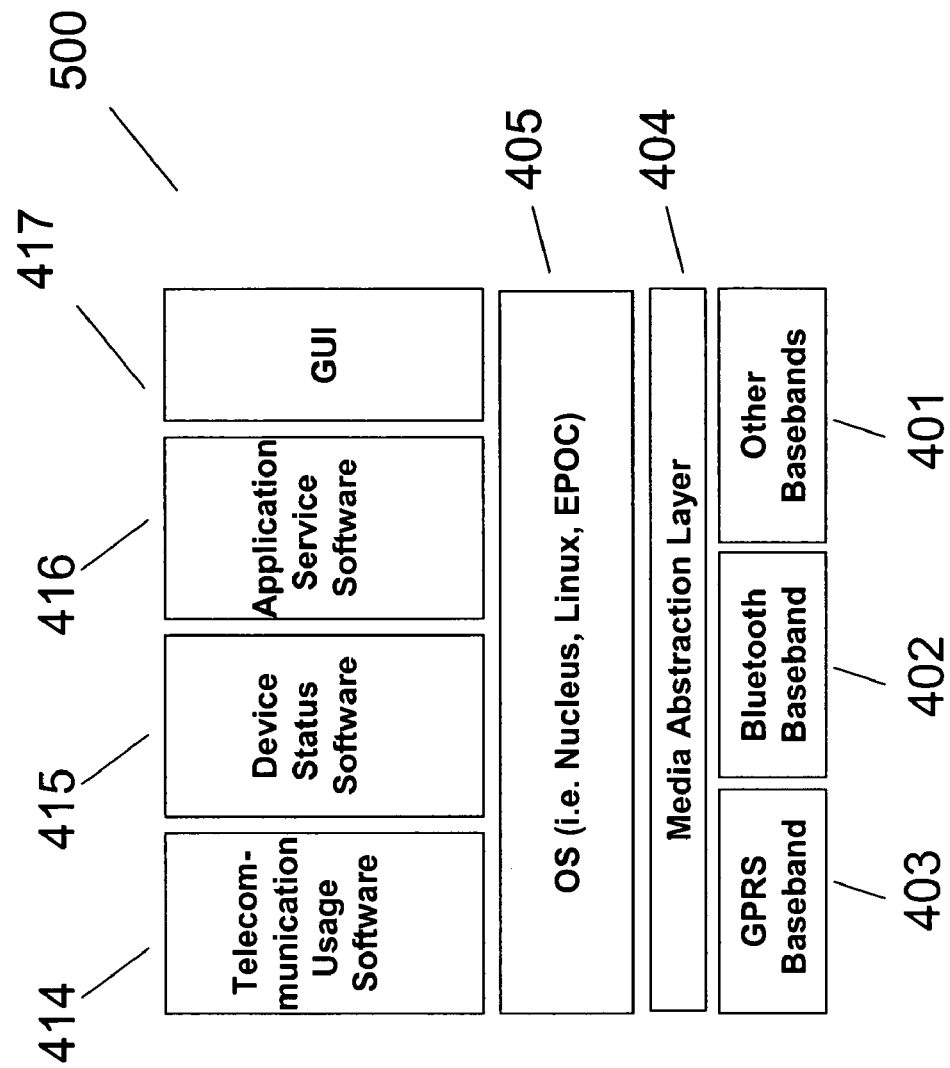
FIG. 4 is a software block diagram architecture for providing output signals to a plurality of devices in a short distance wireless network at a selected environment according to an embodiment of the present invention.
Figure 6:
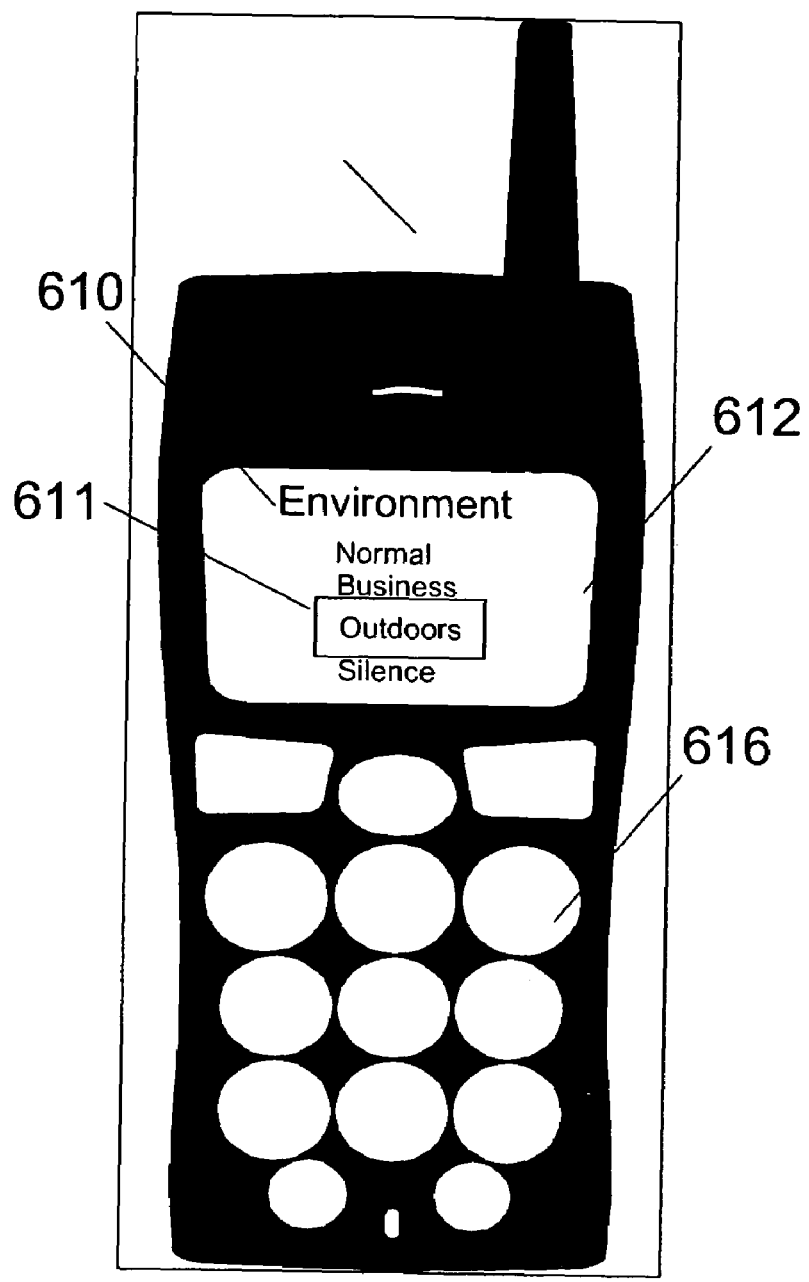
FIG. 6 illustrates a device, such as a cellular telephone, to select an environment according to an embodiment of the present invention.

In an embodiment of the present invention, an environment select ("ES") application software component 416 stored in device 106, as shown in FIG. 4, is used to select an environment. ES 416 transfers respective output values in environment/device output ("ED") database 415 in response to a user selection. An output application software component 414 then uses the corresponding output value in database 414 to generate the predetermined output signal for the corresponding selected environment. For example, output application software component 414 is a ring tone software component used to generate a ring tone at a high level for a cellular telephone in an outdoor environment. In an embodiment of the present invention, a user selects an environment from a plurality of environments 610 shown on a display 612 of device 106, as shown in FIG. 6. In an embodiment of the present invention, device 106 generates a short-range radio signal, indicating the environment selection, to terminals 107 in order to adjust the respective output signals of terminals 107. In an embodiment of the present invention, ED database 414 is stored in device 106 and terminals 107 along with respective output application software components.

When a terminal in terminals 107 enters short distance wireless network 116, after authentication and pairing, device 106 generates a short-range radio signal, indicating the currently selected environment, to the newly arrived terminal in order to adjust the output signals.

A calendar ("Cal") application software component 419, shown in FIG. 4, is used to select an environment based on a user's calendar entry in an alternate embodiment of the present invention. For example, a user enters a business meeting date and period of time entry into device 106 using Cal application software component 419, which then generates a message to ES application software component 419 to adjust device 106 and terminals 107 outputs during the scheduled meeting. In still a further embodiment of the present invention, Cal application software component 419 can be used to select periods of time for a particular environment in order to generate an environment selection message to ES application software component 419. For example, a silent environment message is generated to a user's short distance wireless network 116 during the user's scheduled sleeping time.

In an alternate embodiment of the present invention, a user enters calendar entries at a web site 802 using Cal software component 803 stored on server 101, which in turn generates an environment selection message to device 106 using message generation software component 801.

In still a further embodiment of the present invention, a transmitter device 145 positioned at an entertainment location 145 generates a short-range radio signal, indicating a silent environment, to device 106, as shown in FIG. 1*d*. Device 106 then generates a short-range radio signal, indicating a silent environment, to terminals 107 in order to adjust outputs of terminals 107 corresponding to a silent environment.

Figure 8:
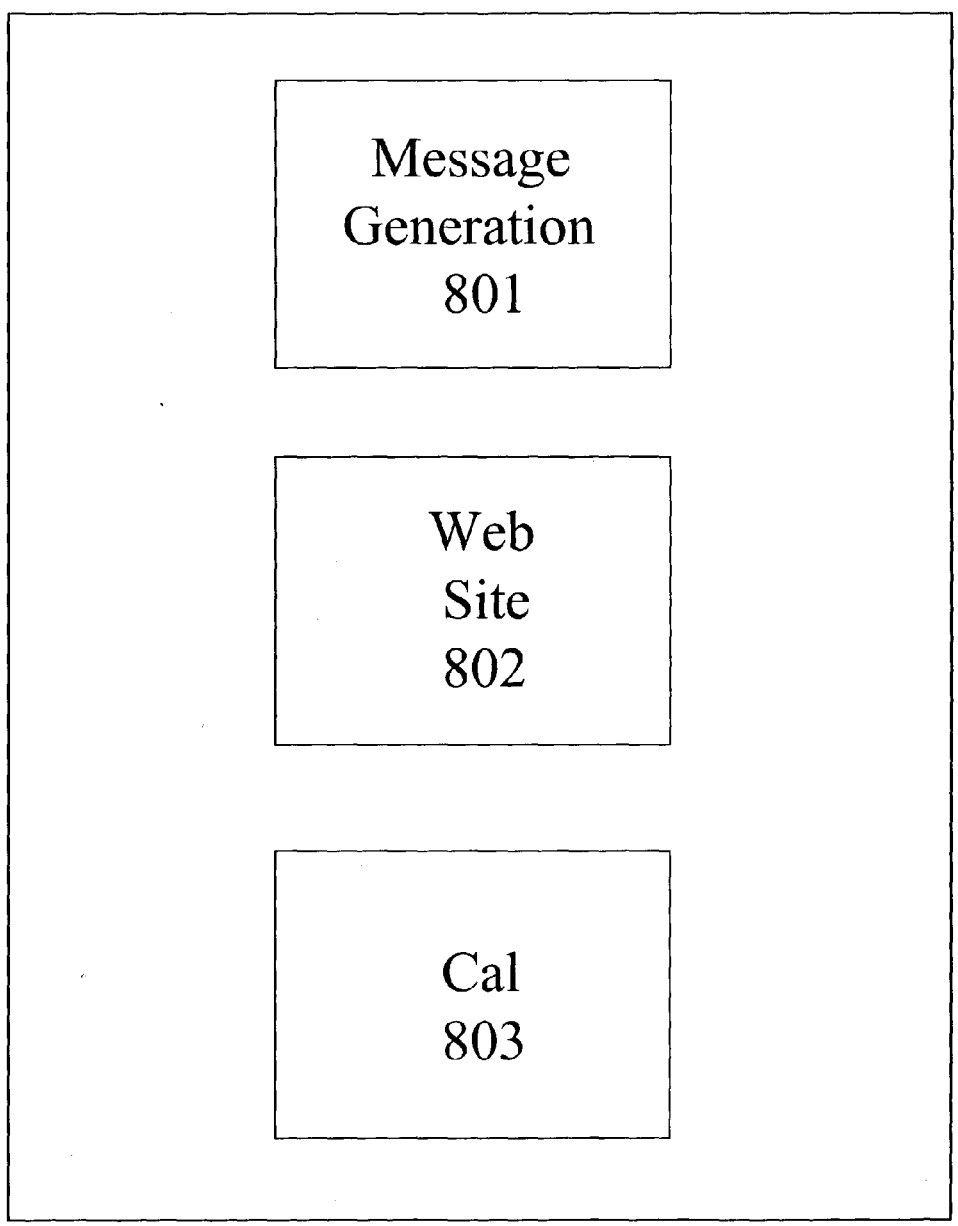
FIG. 8 illustrates a software block diagram architecture of server 101 according to an embodiment of the present invention.
Figure 9:
FIG. 9 illustrates a web page for selecting an environment and/or device output values for a short distance wireless network according to an embodiment of the present invention.

A web site software component and web page, as shown in FIGS. 8 and 9, allows a user to enter environment selection and/or corresponding output values in an embodiment of the present invention. Environment selection and output values, input by a user, then are transferred by message generation software component 801 on processing device 101, by way of a cellular network 129, to device 106.

In an embodiment of the present invention, a short distance wireless network 116 is a network of processing devices, such as a personal computer or headset, that span a relatively small physical area, wherein at least one device generates and receives a short-range radio signal for communicating with another device in the network. In an embodiment of the present invention, a short-range radio signal can travel between approximately 0 and approximately 1000 feet. An example of a short distance wireless network includes a network of devices formed by Bluetooth™, HomeRF, 802.11 technologies, or an equivalent, singly or in combination. In an embodiment of the present invention, each processing device in a short distance wireless network has its own processing unit that executes a software component stored on the processing device memory, but also may access data and devices on the short distance wireless network. In an embodiment of the present invention, a wire, and in particular an Ethernet, provides communication between two or more processing devices in a short distance wireless network. In an alternate embodiment, electromagnetic signals provide wireless communication between one or more processing devices in a short distance wireless network. In still another embodiment, both wires and electromagnetic signals provide communication between processing devices in a short distance wireless network.

In an embodiment of the present invention, a WAN includes multiple LANs and/or short distance wireless networks connected over a relatively large distance. Telephone lines and electromagnetic signals, singly or in combination, couple the LANs and/or short distance wireless networks in a WAN. In an embodiment of the present invention, WAN 105 includes a cellular network 129 generating and receiving cellular signals 111. In an embodiment of the present invention, a cellular network is defined as a communications system dividing a geographic region into sections, called cells. In an analog embodiment of the present invention, the purpose of this division is to make the most use out of a limited number of transmission frequencies. In an analog embodiment of the present invention, each connection, or for example conversation, requires its own dedicated frequency, and the total number of available frequencies is about 1,000. To support more than 1,000 simultaneous conversations, cellular systems allocate a set number of frequencies for each cell. Two cells can use the same frequency for different conversations so long as the cells are not adjacent to each other.

Figure 3A:
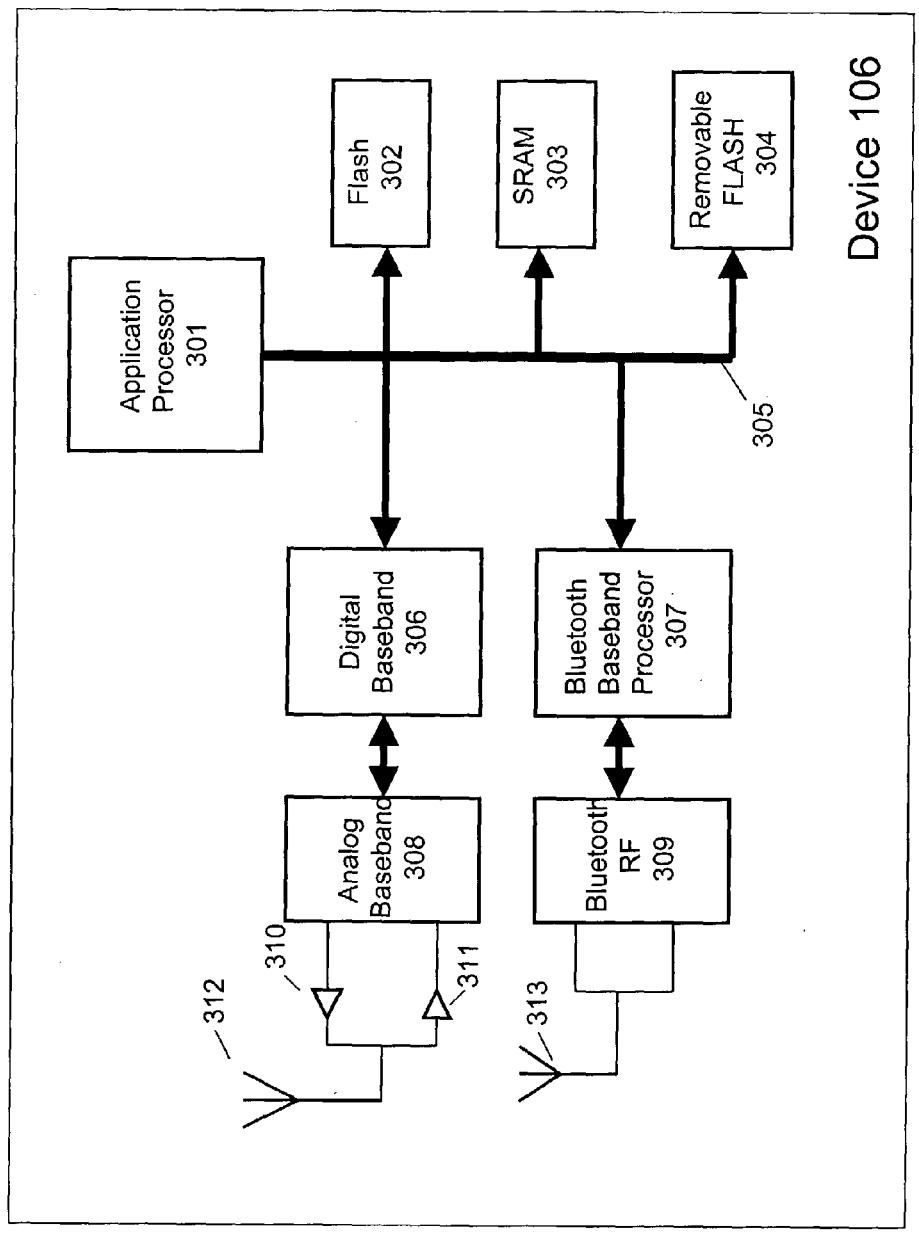
FIGS. 3a–b are hardware block diagrams of devices according to an embodiment of the present invention.
Figure 3B:
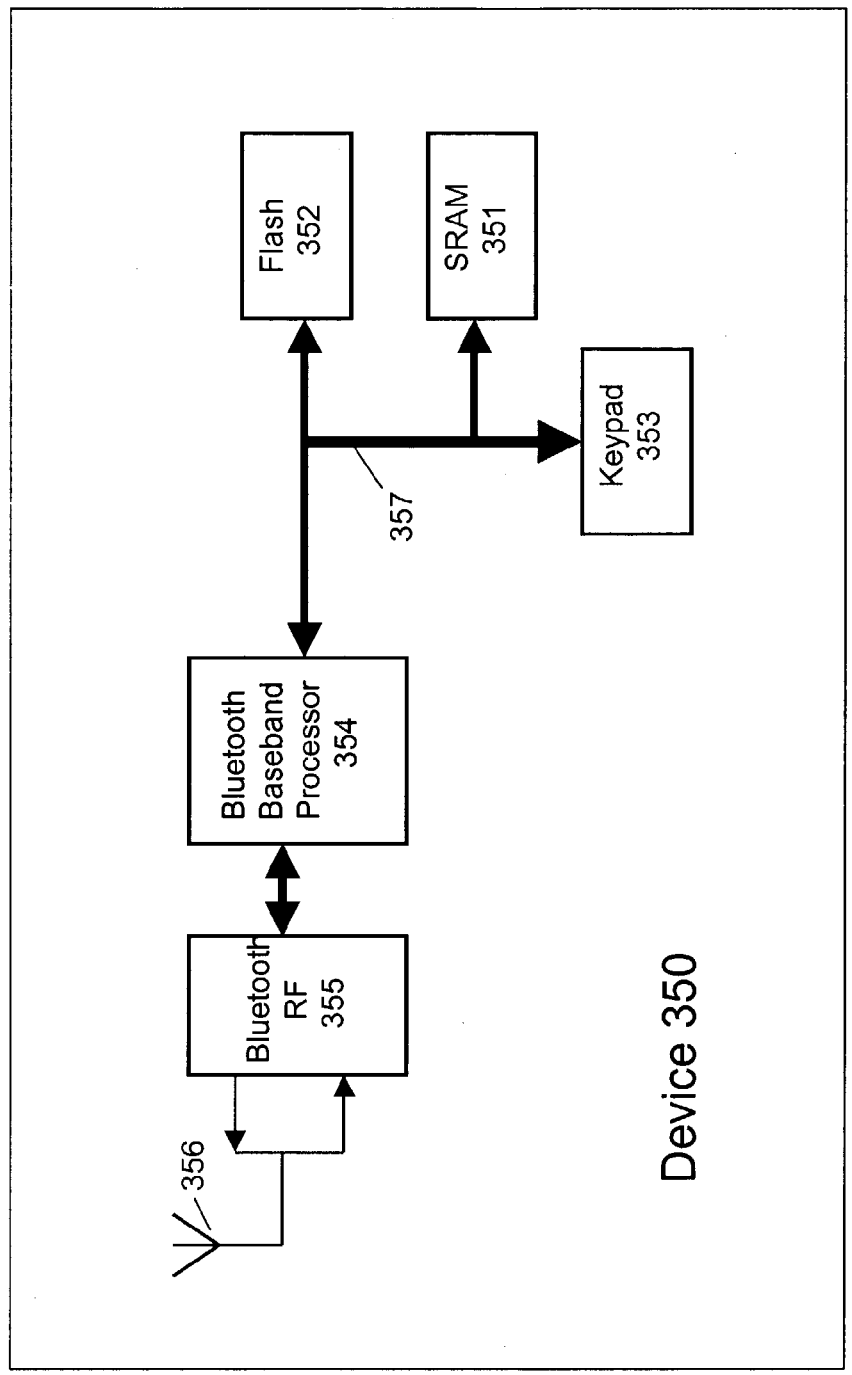

FIG. 1a illustrates system 100 according to an embodiment of the present invention. System 100 includes other devices, or terminals 107, coupled to wireless device 106. In an embodiment of the present invention, device 106 and one or more terminals 107 communicate to form a short distance wireless network 116. In an embodiment of the present invention, terminals 107 are coupled to device 106 by short-range radio signals 110 to form short distance wireless network 116. In an embodiment of the present invention, some or all of terminals 107 may have wired connections. In an embodiment of the present invention, terminals 107 include watch 107a, PDA 107b, headset 107c and laptop computer 107d that generate respective output signals. In an embodiment of the present invention, watch 107a generates an alarm 120; PDA 107b generates a message alert 121; headset 107c generates a ring tone 122; and laptop 107d generates a background image 123. In an alternate embodiment, fewer or more terminals that generate similar or different respective output signals are used in short distance wireless network 116. In an alternate embodiment, terminals 107 include a desktop computer, a pager, a printer, a thin terminal, a messaging terminal, a digital camera or an equivalent. In an embodiment of the present invention, terminals 107 include a Bluetooth™ 2.4 GHz transceiver. Likewise, device 106 includes a Bluetooth™ 2.4 GHZ transceiver. In an alternate embodiment of the present invention, a Bluetooth™ 5.7 GHz transceiver is used. Hardware for device 106 and terminals 107 is illustrated in FIGS. 3a–b in an embodiment of the present invention. Transmitter device 145, shown in FIG. 1d, includes either a 2.4 GHZ or a 5.7 GHZ transmitter to generate a short-range radio signal indicating an environment selection to device 106 in an embodiment of the present invention. In embodiments of the present invention, transmitter device 145 includes only a transmitter or a transmitter and receiver.

In alternate embodiments of the present invention, other local wireless technologies, such as 802.11 or HomeRF signals, are used to communicate between device 106 and terminals 107.

In an embodiment of the present invention, WAN 105 is coupled to device 106. In an embodiment of the present invention, WAN 105 includes a cellular network 129 transmitting and receiving cellular signals 111. In an embodiment of the present invention, cellular signals 111 are transmitted using a protocol, such as a Global System for Mobile communications ("GSM") protocol. In alternate embodiments, a Code Division Multiple Access ("CDMA"), CDMA 2000, Universal Mobile Telecommunications System ("UMTS"), Time Division Multiple Access ("TDMA"), General Packet Radio Service ("GPRS") protocol or an equivalent is used.

In an embodiment of the present invention, WAN 105 includes carrier backbone 104, servers 101–102 and Internet 103. In an embodiment of the present invention, IP packets are transferred between the components illustrated in FIG. 1a. In alternate embodiments of the present invention, other packet types are transferred between the components illustrated in FIG. 1a.

In an embodiment of the present invention, a WAN 105 includes an IP public or private network, such as a corporate secured network using a Virtual Private Network ("VPN").

In an alternate embodiment of the present invention, device 106 is coupled to a WAN 105 by an Ethernet, Digital Subscriber Line ("DSL"), or cable modem connection, singly or in combination.

In an embodiment of the present invention, device 106 is a cellular handset or telephone. In an alternate embodiment of the present invention, device 106 is a cellular enabled PDA, wireless modem and/or wireless laptop computer.

In an embodiment of the present invention, WAN 105 is coupled to a wireless carrier internal network or carrier backbone 104. In an embodiment of the present invention, server 102 is coupled to carrier backbone 104. In an alternate embodiment of the present invention, carrier backbone 104 is coupled to Internet 103. Server 101 is coupled to Internet 103. In an embodiment of the present invention, servers 101 and/or 102 provide an environment selection message and/or ED database 415, as shown in FIGS. 4 and 5, to device 106 and/or terminals 107. In an embodiment of the present invention, ED database 415 is stored in device 106 and used to generate output signals from terminals 107 based on a selected environment. In an alternate embodiment of the present invention, ED database 415 is stored on respective terminals and then used to generate respective output signals based on an environment select short-range radio signal from device 106.

In an embodiment of the present invention, server 101 stores message generation software component 801, web site software component 802 and calendar software component 803, singly or in combination, as illustrated in FIG. 8.

In an embodiment of the present invention, server 101, and in particular message generation software component 801, generates a message including a selected environment transferred over WAN 105 to device 106 in short distance wireless network 116. In an embodiment of the present invention, the message is an Internet/Protocol ("IP") message. In an embodiment of the present invention, message generation software component 801 generates a message, including a selected environment, in response to user input from web site software component 802 and/or from calendar software component 803. In still a further embodiment of the present invention, message generation software 801 generates a message including a ED database 415 to device 106 and/or terminals 107.

Message generation software component 801 is responsible for generating a message, which may include a selected environment, to device 106 and/or terminals 107 in short distance wireless network 116 in an embodiment of the present invention Server 102, coupled to carrier backbone 104, has similar software components described above and bypasses Internet 103 in an alternate embodiment of the present invention.

II. Hand-held Device/Terminal Hardware

FIG. 2 illustrates embodiments of terminals 107 and device 106. In an embodiment of the present invention, there are two types of terminals: 1) smart terminals and 2) thin terminals. In an alternate embodiment of the present invention, smart terminals execute user logic and applications. Smart terminals have a relatively powerful processing unit, operating system and applications. Their main needs from a short distance wireless network 116 are access to a WAN 105 through TCP/IP and other network services such as storage and execution. For example, a laptop computer 107d and PDA 107b are smart terminals. Thin terminals have a relatively low power processing unit and operating system. They are mainly used as peripherals to an application server in a short distance wireless network 116 and their main task is user interaction, rendering output for a user and providing an application server with a user's input. For example, a watch 107a or messaging terminals can be thin terminals.

FIG. 2 illustrates thin terminals. Voice terminal 204 includes a display 204b and a retractable keypad 204a. Messaging Terminal 203 is illustrated in a closed position with a hinge 203a used to open and close terminal 203. Terminal 203 also includes a miniature QWERTY keyboard and display when opened.

In an embodiment of the present invention, device 201 is a cellular modem and includes a clip 202 for a belt.

FIG. 3a illustrates a hardware block diagram of device 106 in an embodiment of the present invention. Device 106 includes both internal and removable memory. In particular, device 106 includes internal FLASH (or Electrically Erasable Programmable Read-Only Memory ("EEPROM")) and Static Random Access Memory ("SRAM") 302 and 303, respectively. Removable FLASH memory 304 is also used in an embodiment of the present invention. Memories 302, 303, and 304 are coupled to bus 305. In an embodiment of the present invention, bus 305 is an address and data bus. Application processor 301 is likewise coupled to bus 305. In an embodiment of the present invention, processor 301 is a 32-bit processor.

Bluetooth™ processor 307 is also coupled to bus 305. Bluetooth™ RF circuit 309 is coupled to Bluetooth™ processor 307 and antenna 313. Processor 307, RF circuit 309 and antenna 313 transceive and receive short-range radio signals to and from terminals 107, illustrated in FIG. 1a, or device 350 illustrated in FIG. 3b.

Cellular, such as GSM, signals are transmitted and received using digital circuit 306, analog circuit 308, transmitter 310, receiver 311 and antenna 312. Digital circuit 306 is coupled to bus 305. In alternate embodiments, device 106 includes a display, a speaker, a microphone, a keypad and a touchscreen, singly or in combination.

FIG. 3b illustrates device 350 that is a hand-held device in an embodiment of the present invention. Device 350, in an embodiment of the present invention, is one of the terminals 107 illustrated in FIG. 1a. Similar to device 106, device 350 includes SRAM and FLASH memory 351 and 352, respectively. Memories 351 and 352 are coupled to bus 357. In an embodiment of the present invention, bus 357 is an address and data bus. Keypad 353 is also coupled to bus 357. Short-range radio signals are transmitted and received using Bluetooth™ processor 354 and Bluetooth™ RF circuit 355. Antenna 356 is coupled to Bluetooth™ RF circuit 355. In an embodiment of the present invention, antenna 356 transmits and receives short-range radio signals. In alternate embodiments, device 350 includes a display, a speaker, a microphone, a keypad and a touchscreen, singly or in combination. As one of ordinary skill in the art would appreciate, other hardware components would be provided for device 350 in alternate embodiments of the present invention. For example in an embodiment in which device 350 is a laptop computer 107d, a disk drive and other input/output components are present.

III. Software

FIG. 4 illustrates a software architecture 400 for device 106 illustrated in FIG. 3a according to an embodiment of the present invention. In an embodiment of the present invention, software 400 is stored in FLASH memory 302 of device 106. In an alternate embodiment of the present invention, software components 414, 415 416 and 419 are stored, singly or in combination, in FLASH memory 353 in a terminal of terminals 107. In an embodiment of the present invention, software components referenced in FIG. 4 represent a software program, a software object, a software function, a software subroutine, a software method, a software instance, and a code fragment, singly or in combination. In an alternate embodiment, functions performed by software components illustrated in FIG. 4 are carried out completely or partially by hardware.

In an embodiment of the present invention, software 400, or components of software 400, is stored in an article of manufacture, such as a computer readable medium. For example, software 400 is stored in a magnetic hard disk, an optical disk, a floppy disk, Compact Disk Read-Only Memory ("CD-ROM"), Random Access Memory ("RAM"), Read-Only Memory ("ROM"), or other readable or writeable data storage technologies, singly or in combination. In yet another embodiment, software 400, or components thereof, is downloaded from server 101 illustrated in FIG. 1.

Software 400 includes telecommunication software or physical layer protocol stacks, in particular cellular communications software 403 and short-range radio communications software 402. In an embodiment of the present invention, communication software 403 is a GPRS baseband software component used with processor 306 to transmit and receive cellular signals. In an embodiment of the present invention, communication software 402 is a Bluetooth™ baseband software component used with processor 307 to transmit and receive short-range radio signals. Other telecommunication software may be used as illustrated by other basebands 401.

In an embodiment of the present invention, operating system ("OS") 405 is used to communicate with telecommunications software 402 and 403. In an embodiment of the present invention, operating system 405 is a Linux operating system, EPOC operating system available from Symbian software of London, United Kingdom or a PocketPC or a Stinger operating system available from Microsoft® Corporation of Redmond, Wash. or Nucleus operating system, available from Accelerated Technology, Inc. of Mobile, Ala. Operating system 405 manages hardware and enables execution space for device software components.

Media abstraction layer 404 allows operating system 405 to communicate with basebands 403, 402 and 401, respectively. Media abstraction layer 404 and other abstraction layers translate a particular communication protocol, such as GPRS, into a standard command set used by a device and/or terminal. The purpose of an abstraction layer is to isolate the physical stacks from the rest of the device software components. This enables future usage of different physical stacks without changing any of the upper layer software and allows the device software to work with any communication protocol.

Software 400 includes ES software component 416 used to select appropriate output values in response to an environment selection in an embodiment of the present invention. Environmental selections are provided by a variety of different sources. ES software component 416 handles the communications and interfaces with the various sources.

First, a user can select, at device 106, an environment from a plurality of environments provided by ES software component 416 at device 106. FIG. 6 illustrates a user selecting an "outdoors" selection 611 from a plurality of environments 610 on display 612 of device 106. A user can highlight the appropriate environment and then press button 616 in order to select the desired environment. Watch 107a or an equivalent device can provide a similar display.

Second, device 106 can receive an environment selection in a short-range radio signal form a terminal in terminals 107.

Third, a terminal can receive an environment selection after entering the short distance wireless network 116. Typically, a terminal will first be authenticated and paired before entering the short distance wireless network. The terminal will then generate a short-range radio signal requesting a selected environment. Device 106, and in particular EA software component 416 will cause a short-range radio signal, including the selected environment, to be generated to the newly arrived terminal.

Fourth, server 101 in response to a user input at a web site 802, as shown in FIG. 8, can generate an environmental selection. In particular, a selection of an environment is obtained from a list of environments 902 provided by web page 900 from web site 802, shown in FIG. 9. Message generation software component 801 generates a message, including an environment selection, to device 106 in response to a user environment selection at web page 900. Upon entering a user name in user field 901 and an appropriate password, a user can select an environment from a list of environments 902. In another embodiment of the present invention, a user can customize the output levels or values of devices and terminals in short distance wireless network 116 by selecting the appropriate device in the list of devices 903 and corresponding output values 904 for the selected environment and device. These output values for corresponding devices and environments are then downloaded by message generation software component 801 to ED database 415.

In yet another embodiment of the present invention, a user can customize or define a particular environment along with predetermined output values from respective devices in a short distance wireless network 116.

Fifth, a software component, such as a Cal software component 419, can generate an environment message to ES application software component 416 based on user entries. For example, a user may schedule a business meeting for a particular date and period of time and enter this information in Cal software component 419. Upon that date and for the scheduled period of time, Cal software component 419 generates an environment selection message to ES application software component 416, which then selects the device output values for the business environment during the business period of time. After the scheduled period of time for the meeting ends, ES application software component 416 defaults back to the normal environment in an embodiment of the present invention.

Sixth, a transmitter generates an environment selection, such as a silent environment selection, at an entertainment location. When a user enters an entertainment location in which output signals should be or are required to be muted, a transmitter device 145 generates a silent environment selection to device 106.

Once ES software component 416 receives a selected environment, ES software component 416 retrieves the corresponding output values in ED database 416, as shown in FIGS. 4 and 5, and transfers the values to output application software components. FIG. 5 shows a database having rows of types of environments 502 and columns of corresponding device output values 501. For example, database 415 shows that for a selected "Business" environment: a telephone ring tone should be switched to "vibrate"; a laptop brightness should be switched to "medium"; a watch alarm should be switched to "off"; and, a messaging terminal should be in "English." In contrast, a "silence" environment has all device output values at "off" except for the messaging terminal at "English."

Output application software component 414 then generates the appropriate output signal for the selected environment based on the transferred output values in database 416. In an embodiment of the present invention, an output application software component is a ring tone application, display brightness application, alarm application, text display application, singly or in combination, or an equivalent.

In an embodiment of the present invention, output application software component 414 is a text display application having a database containing multiple languages and/or fonts. Output application software component 414 then generates a particular language and/or font responsive to a selected environment.

As described above, Cal application software component 419 is used to obtain calendar entries from users at device 106 and generate an environment select message to ES application software component 416 in an embodiment of the present invention. In an alternate embodiment of the present invention, Cal software component 803, web site software component 802 and message generation software 801 are used to obtain calendar entries and generate messages containing a selected environment.

In an embodiment of the present invention, operating system 405, Bluetooth™ Baseband software component 402, ES application software 416, database 415 and output application 414 are used to generate short-range radio signals 110 to terminals 107 used to generate respective terminal output signals.

In an embodiment of the present invention, Graphics User Interface ("GUI") 417 is provided to allow a user-friendly interface and is used as an output application software component in which the fonts and/or language can be altered based on an environment selection. For example, for a "Germany" environment selection, a GUI using "English" text would be changed to "German" text.

FIGS. 7a–f illustrate a method 700a–f for providing output signals to device/terminals in a short distance wireless network 116 in response to an environment selection according to an embodiment of the present invention. In an embodiment, a method is performed, in part or completely, by software components illustrated in FIGS. 4 and 8. In an embodiment of the present invention, a logic box or step illustrated in FIGS. 7a–f may represent an execution of a software component, such as a software program, a software object, a software function, a software subroutine, a software method, a software instance, a code fragment, singly or in combination. In an alternate embodiment of the present invention, a logic box or step represents execution of a software component, hardware operation or user operation, singly or in combination. In an alternate embodiment of the present invention, fewer or more logic boxes or steps are carried out in the method illustrated in FIGS. 7a–f.

Figure 7A:
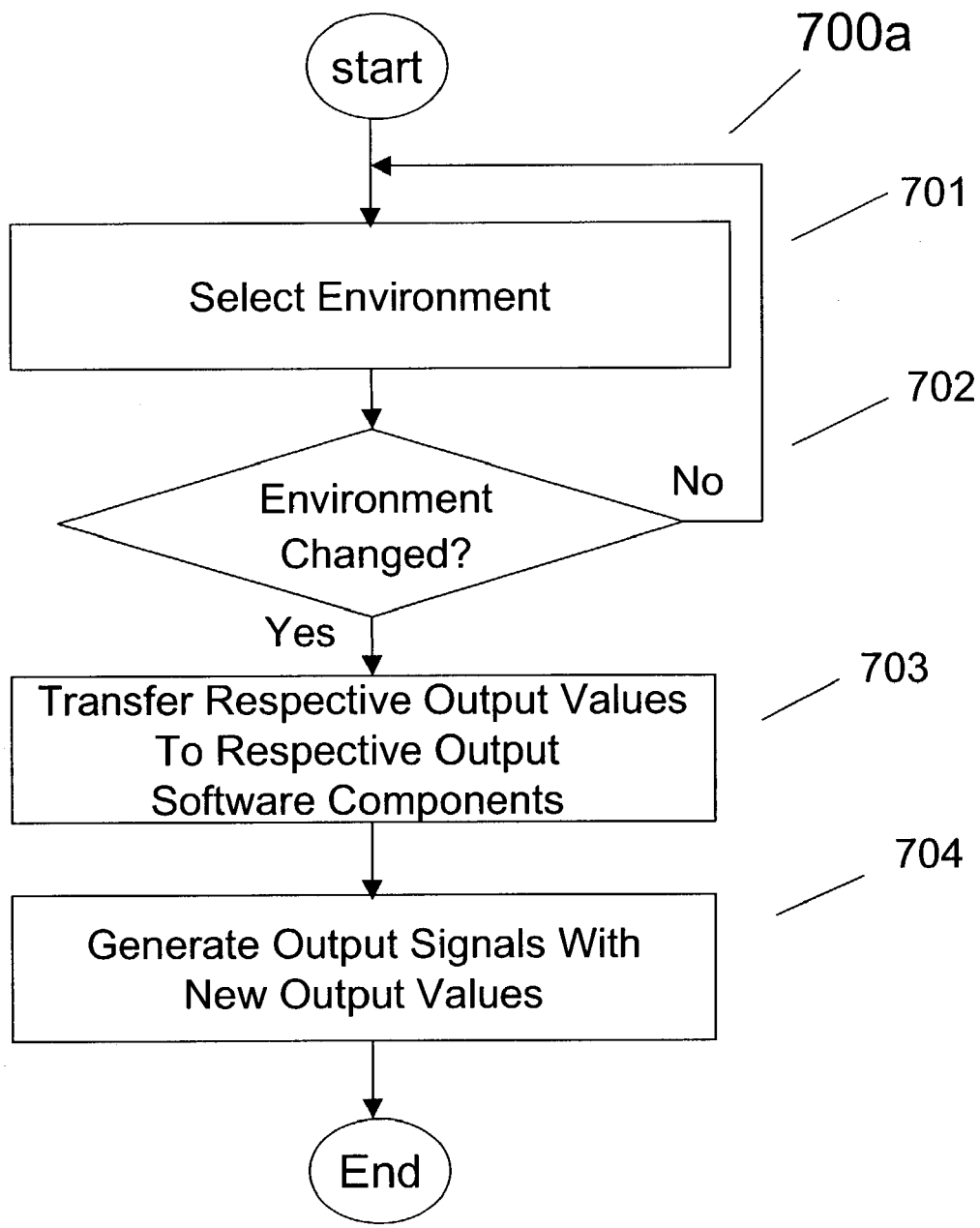
FIGS. 7a–f are flowcharts illustrating providing a plurality of output signals to devices in a short distance wireless network at a selected environment according to an embodiment of the present invention.

FIG. 7a illustrates a method 700a according to an embodiment of the present invention. An environment is selected as illustrated by logic block 701. Embodiments of selecting an environment are shown in FIGS. 7b–f. A determination is made whether an environment has been selected for a short distance wireless network 116 as illustrated by logic block 702. In an embodiment of the present invention, a selected environment is compared to a current or default environment by ES software application 416. If an environment has been changed control passes to logic block 703; otherwise, control passes to logic block 701. Output values for the selected environment are then transferred to output software components as illustrated by logic block 703. In an embodiment of the present invention, ES software component 416 transfers output values in ED database 415 to output application software component 414. Output signals are then generated using the transferred output values as illustrated by logic block 704. In an embodiment of the present invention, output application software component 414 generates an output signal responsive to the transferred output values from database 415 for the selected environment.

Figure 7B:
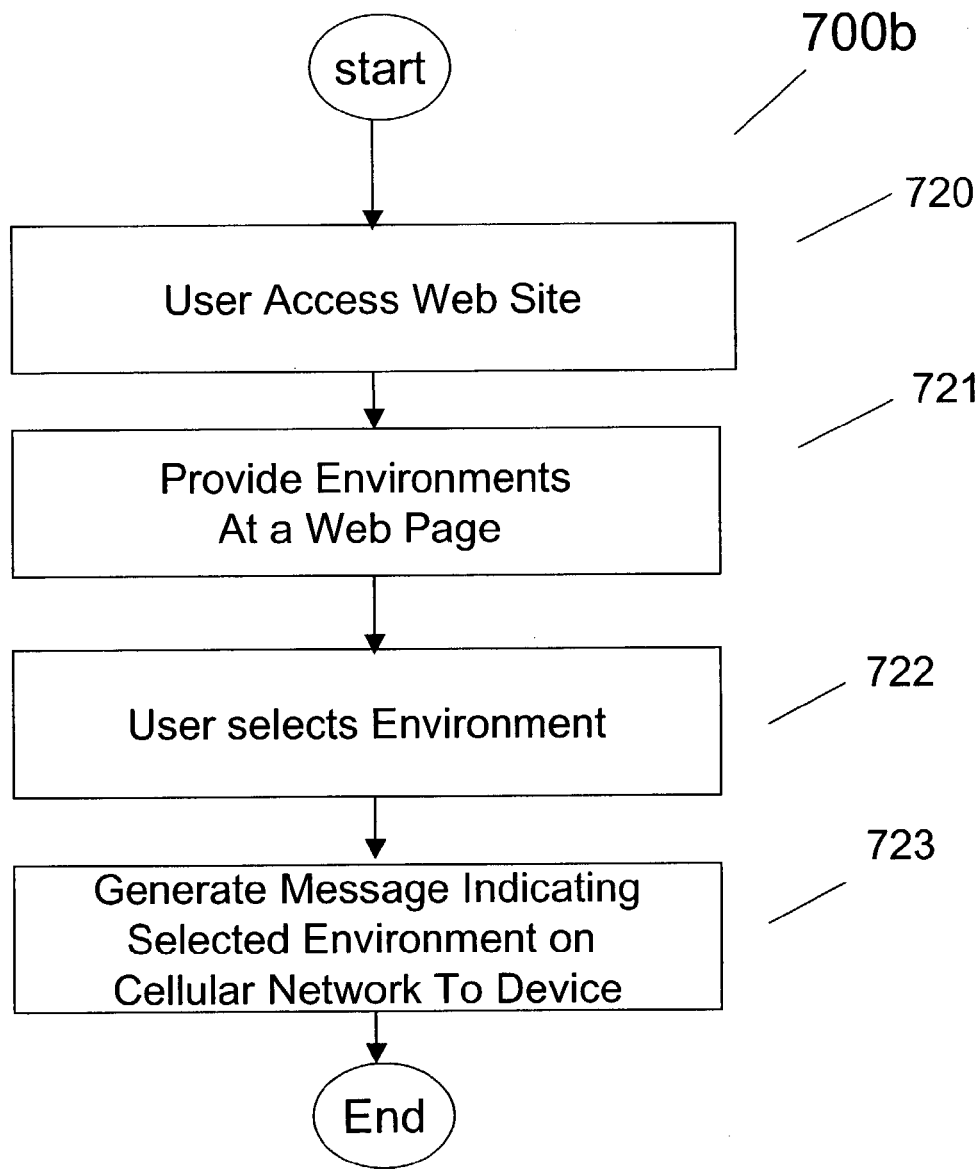

FIG. 7b illustrates a method 700b for selecting an environment using a web site. In an embodiment of the present invention, method 700b is used for logic block 701 shown in FIG. 7a. A user accesses a web site as illustrated by logic block 720. In an embodiment of the present invention, a user access a web site provided by web site software component 802 stored on server 101. In an embodiment of the present invention, a user enters a user name and password to obtain a web page for selecting an environment as shown in FIG. 9. A plurality of environment selections are provided as illustrated by logic block 721. In an embodiment of the present invention, a plurality of environments 902 as seen in FIG. 9 is provided. In logic block 722, a user then selects an environment. A message is then generated indicating the selected environment in logic block 723. In an embodiment of the present invention, message generation software component 801 generates a message, including the selected environment, to device 106 having ES software component 416.

Figure 7C:
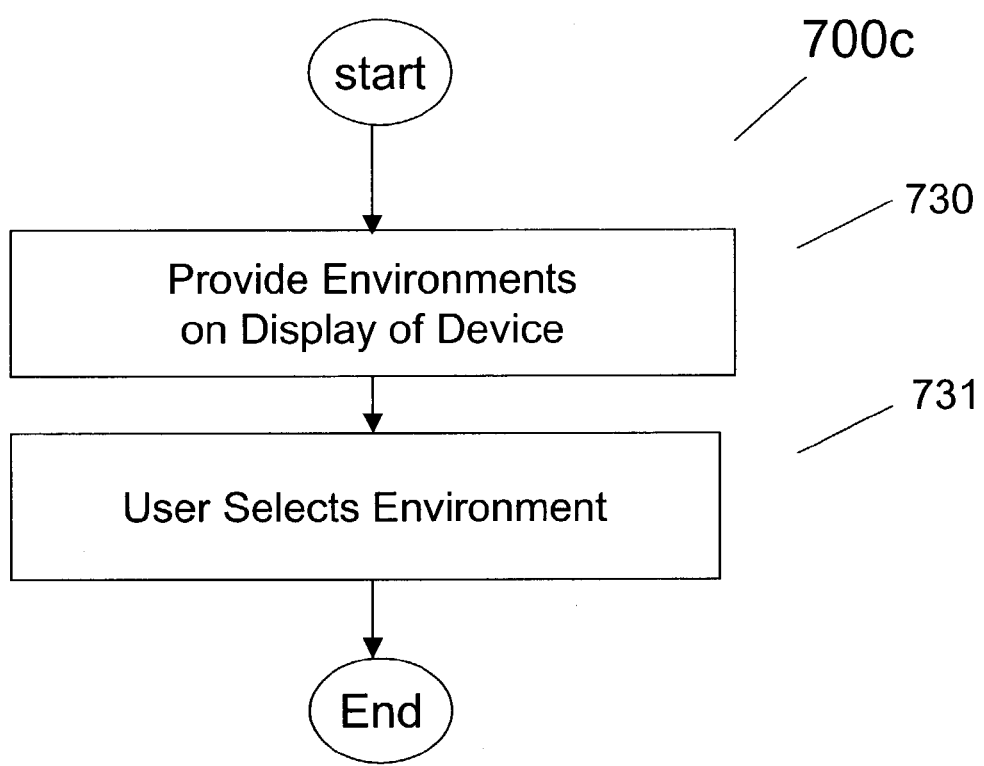

FIG. 7c illustrates a method 700c for selecting an environment at a device. In an embodiment of the present invention, method 700c is used for logic block 701 shown in FIG. 7a. A plurality of environments are provided by a device in logic block 730. In an embodiment of the present invention, a cellular telephone 106, having ES software component 416, provides a plurality of environments 610 on a display 612, as shown in FIG. 6. In logic block 731, a user selects a listed environment. In an embodiment of the present invention, a user presses button 616 to highlight and then select an environment from the plurality of environments 610.

Figure 7D:
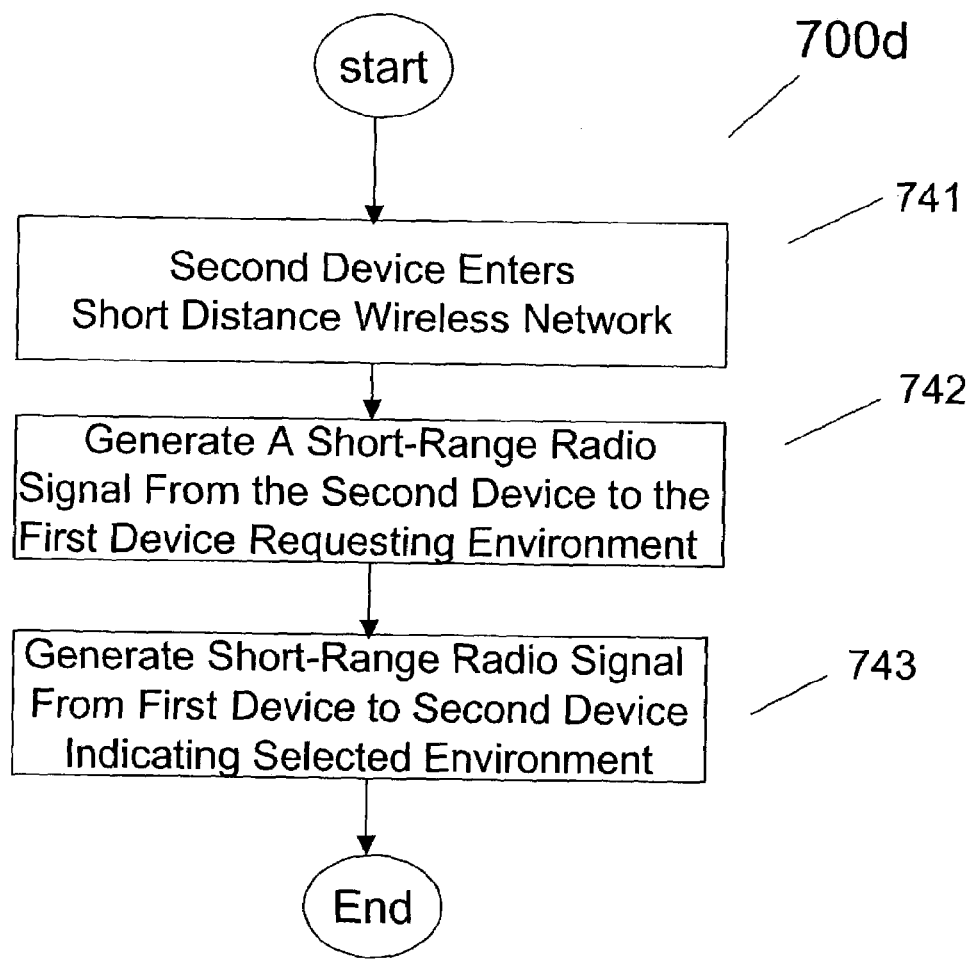

FIG. 7d illustrates a method 700d for selecting an environment when a device enters a short distance wireless network. In an embodiment of the present invention, method 700d is used for logic block 701 shown in FIG. 7a. A second device, such as PDA 107b shown in FIG. 1a, enters short distance wireless network 116, as shown by logic block 741. In logic block 742, a second device generates a short-range radio signal requesting a selected environment from a first device, after appropriate authentication and pairing. In an embodiment of the present invention, the first device is device 106 having ES software component 416. A first device then generates a short-range radio signal to the second device indicating the selected environment as shown in logic block 743. In an embodiment of the present invention, ES software 416 stored on device 106 includes a default or current environment for the selected environment. In an embodiment of the present invention, the first device also has ES software component 416, ED database 415 and output application software component 414.

Figure 7E:
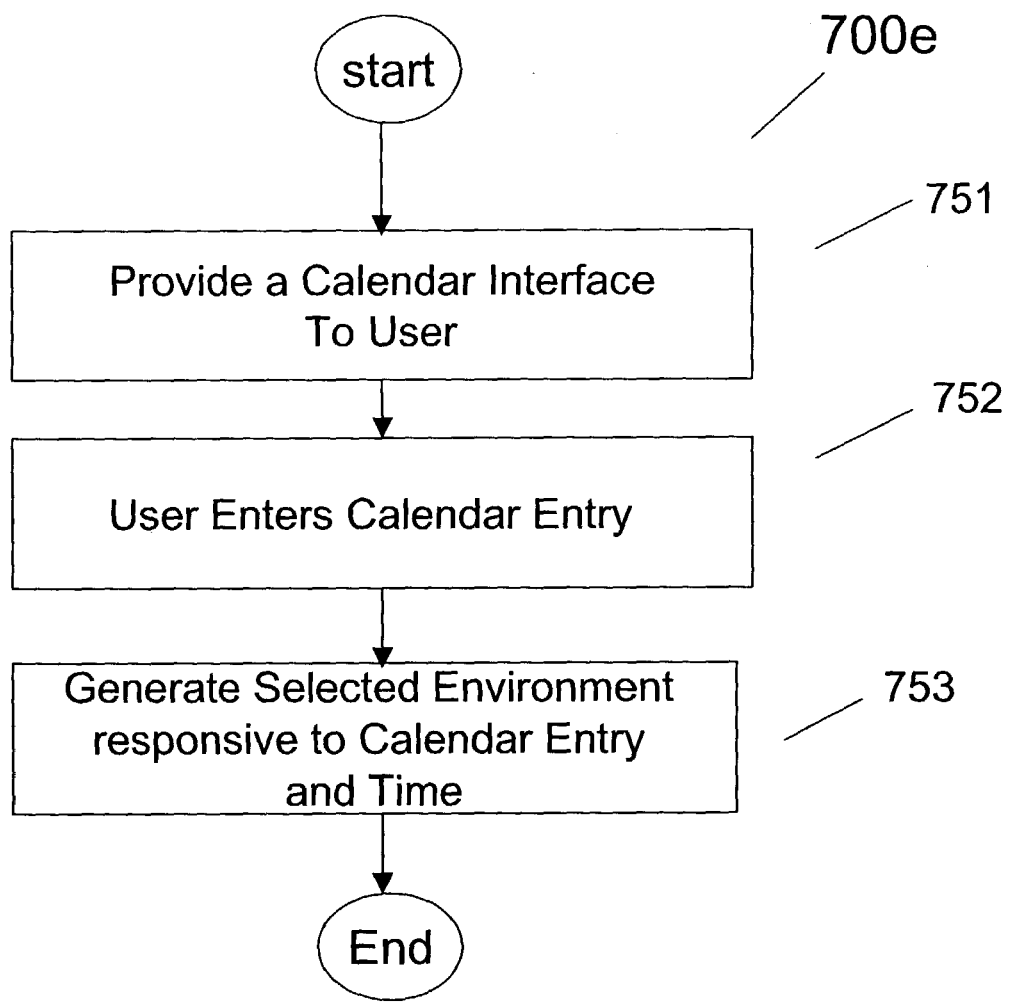

FIG. 7e illustrates a method 700e for selecting an environment when using a software program, such as a calendar software program. In an embodiment of the present invention, method 700e is used for logic block 701 shown in FIG. 7a. A calendar interface is provided to a user as shown by logic block 751. In an embodiment of the present invention, either Cal software component 803 on server 101 or Cal software component 419 on device 106 is used. In logic block 752, a user inputs an entry, such as a date and period of time. In an embodiment of the present invention, a user may also categorize the entry. For example, the user may classify the entry as business or sleep. In logic block 753, a selected environment message is generated in response to a clock and the calendar entry. In an embodiment of the present invention, Cal software component 803 and message generation 801 generates a message, by way of cellular network 129, to device 106 indicating the selected environment. In an alternate embodiment of the present invention, Cal software component 419 generates a message to ES software component 416 in device 106. In an embodiment of the present invention, ES software component 416 translates a calendar message to the appropriate environment. For example, Cal software component 419 may generate message, including a meeting in a conference room, to ES software component 416, which will then interpret the meeting in the conference room to a business environment selection.

Figure 7F:
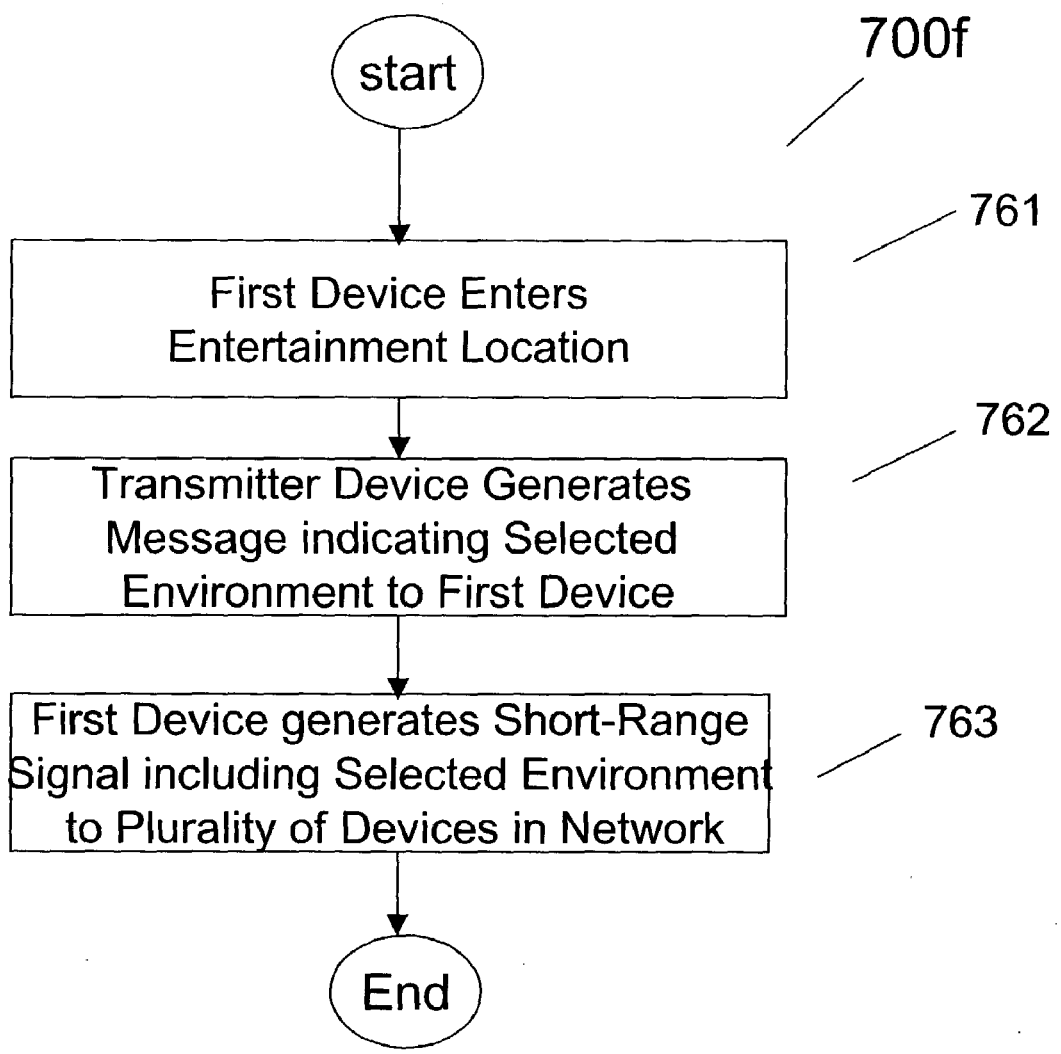

FIG. 7f illustrates a method 700f for selecting an environment when using a transmitter at an entertainment location. In an embodiment of the present invention, method 700f is used for logic block 701 shown in FIG. 7a. In logic block 761, a device enters an entertainment location. In an embodiment of the present invention, device 106 enters entertainment location 151 shown in FIG. 1d. In logic block 762, a transmitter device generates a selected environment to the first device. In an embodiment of the present invention, transmitter device 145 generates a silent environment to device 106. In logic block 763, the first device generates a short-range signal, including the selected environment to the plurality of devices in the network. In an embodiment of the present invention, device 106 generates a short-range radio signal to watch 107a in response to the silence environment selection from transmitter device 145.

IV. Conclusion

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A system for altering output signals of devices connected by a short distance wireless network in response to a selection of an environment, comprising:
  a. a cellular device, connected to said a short distance wireless network, comprising:
    I. a memory for storing values, of said output signals of said devices, associated with said selection of an environment;
    II. means for selecting said environment from a plurality of environment selections displayed; and
    III. means for generating a first short-range radio signal to indicate a selection of said environment, and to indicate said values of said output signals;
  b. a first device, connected to said short distance wireless network to said cellular device, capable of altering the value of at least one type of its output signals in response to the first short-range radio signal, wherein the first type of output signal is an audio signal; and
  c. a second device, connected to said short distance wireless network to said cellular device, capable of altering the value of a second type of output signal in response to the first short-range radio signal, wherein the second type of output signal is a display signal.

2. The system of claim 1, wherein the selection of the environment includes a user pressing a button indicating a selection of the environment.

3. The system of claim 1, wherein the second device generates a second short-range radio signal indicating the selection of the environment in response to the first short-range radio signal.

4. The system of claim 1, wherein the first device generates a second short range radio signal, comprising a request for the first short-range radio signal, after entering the short distance wireless network.

5. The system of claim 1, wherein the selection of the environment is saved in a software component in response to a user's input.

6. The system of claim 5, wherein the software component is a calendar software program and the user input is a calendar entry including a period of time.

7. The system of claim 1, further comprising:
a cellular network to provide a cellular signal to the cellular device;
a wide area network coupled to the cellular network; and,
a processing device, coupled to the wide area network, to generate a message, comprising the selection of the environment, to the cellular device.

8. The system of claim 7, further comprising a web site stored at the processing device to allow a user to make the selection of the environment.

9. The system of claim 1, wherein the first device and second device are selected from a group consisting of a desktop computer, a laptop computer, a personal digital assistant, a headset, a messaging terminal, a pager, a printer, a watch, a thin terminal, and a digital camera.

10. The system of claim 1, wherein the cellular device uses a protocol selected from the group consisting of a Global System for Mobile Communications ("GSM"), a Code Division Multiple Access ("CDMA"), a CDMA 2000 protocol, a Time Division Multiple Access ("TDMA"), and General Packet Radio Services ("GPRS").

11. The system of claim 1, wherein the first device includes a short-distance radio processor and a 2.4 GHZ transceiver.

12. The system of claim 1, wherein the first device includes a short-distance radio processor and a 5.7 GHZ transceiver.

13. The system of claim 1, wherein the short distance wireless network is a Bluetooth™ network.

14. The system of claim 1, wherein the selection of the environment includes a user selecting a first name corresponding to the environment provided by a display of the cellular device.

15. The system of claim 1, wherein the environment is a meeting.

16. The system of claim 1, wherein the environment is silence.

17. The system of claim 1, wherein the environment is normal.

18. The system of claim 1, wherein the environment is outdoors.

19. The system of claim 1, wherein the first type of output signal includes a ring tone.

20. The system of claim 1, wherein the first type of output signal includes a vibration signal.

21. The system of claim 1, wherein the first type of output signal includes an alarm signal.

22. The system of claim 1, wherein the second type of output signal includes changing from a first language to a second language.

23. The system of claim 1, wherein the first device includes a watch having a button to select the environment and the second device is a messaging terminal.

24. A method for altering output signals of devices connected by a short distance wireless network in response to a selection of an environment, comprising:
a. providing a cellular device, connected to said short distance wireless network, comprising:
I. a memory for storing values, of said output signals of said devices, associated with said selection of an environment:
II. means for selecting said environment from a plurality of environment selections displayed; and
III. means for generating a first short-range radio signal to indicate a selection of said environment, and to indicate said values of said output signals;
b. providing a first device, connected to said short distance wireless network to said cellular device, capable of altering the value of at least one type of its output signals in response to the first short-range radio signal, wherein the first type of output signal is an audio signal; and
c. providing a second device, connected to said short distance wireless network to said cellular device, capable of altering the value of a second type of output signal in response to the first short-range radio signal, wherein the second type of output signal is a display signal.

25. The method of claim 24, wherein the selecting includes a user selecting a name, indicating the selected environment, for the first device.

26. The method of claim 24, wherein the selecting includes a processing device generating a message, indicating the selected environment, over a cellular network, to the first device generating the first short-range radio signal.

27. The method of claim 24, wherein the selecting includes a third device generating a name indicating the selected environment to the first device.

28. The method of claim 27, wherein the third device is located near an entertainment location.

29. The method of claim 24, wherein the environment is a meeting.

30. The method of claim 24, wherein the environment is silence.

31. The method of claim 24, wherein the environment is normal.

32. The method of claim 24, wherein the environment is outdoors.

33. The method of claim 24, wherein the first type of output signal includes a ring tone.

34. The method of claim 24, wherein the first type of output signal includes a vibration signal.

35. The method of claim 24, wherein the first type of output signal includes an alarm signal.

36. The method of claim 24, wherein the second type of output signal includes changing from a first language to a second language.

* * * * *